(12) United States Patent
Tsoumas et al.

(10) Patent No.: US 12,388,353 B2
(45) Date of Patent: Aug. 12, 2025

(54) METHOD FOR CONTROLLING AN ENERGY CONVERSION SYSTEM, ENERGY CONVERSION SYSTEM, CONTROLLER, COMPUTER PROGRAM, AND COMPUTER-READABLE MEDIUM

(71) Applicant: ABB Schweiz AG, Baden (CH)

(72) Inventors: Ioannis Tsoumas, Zurich (CH); Georgios Darivianakis, Zurich (CH); Daniel Ulmer, Liestal (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/556,313

(22) PCT Filed: Apr. 19, 2022

(86) PCT No.: PCT/EP2022/060245
§ 371 (c)(1),
(2) Date: Oct. 19, 2023

(87) PCT Pub. No.: WO2022/223519
PCT Pub. Date: Oct. 27, 2022

(65) Prior Publication Data
US 2024/0204650 A1    Jun. 20, 2024

(30) Foreign Application Priority Data
Apr. 19, 2021 (EP) .................................... 21169116

(51) Int. Cl.
*H02M 1/12* (2006.01)
*H02J 3/01* (2006.01)
(Continued)

(52) U.S. Cl.
CPC .............. *H02M 1/12* (2013.01); *H02J 3/01* (2013.01); *H02J 3/36* (2013.01); *H02J 3/38* (2013.01); *H02J 2300/28* (2020.01)

(58) Field of Classification Search
CPC ...... H02M 1/12; H02J 3/01; H02J 3/36; H02J 3/38; H02J 2300/28
See application file for complete search history.

(56) References Cited

U.S. PATENT DOCUMENTS 8,013,461 B2 *  9/2011  Delmerico ............... H02P 9/42
                                                                    290/44
8,350,397 B2 *  1/2013  Lang ......................... H02P 9/10
                                                                    290/44
(Continued)

FOREIGN PATENT DOCUMENTS

EP                 2312739 B1       7/2013
WO     WO-2017129766 A1 *   8/2017  ................ H02J 3/01

OTHER PUBLICATIONS

Shen et al., Modulation Schemes for a 30 MVA IGCT Converter using NPC H-Bridges. 2014 IEEE Energy Conversion Congress and Exposition (ECCE). pp. 5531-5538, Sep. 14-18, 2014.

(Continued)

*Primary Examiner* — Carlos Amaya
(74) *Attorney, Agent, or Firm* — Michael M. Gnibus; McCarter & English, LLP (57) ABSTRACT

The present disclosure provides a method for controlling an energy conversion system. The system includes a rotating electrical machine, a machine-side converter, a DC-link, and a grid-side converter. The method includes modulating the machine-side converter for converting an AC voltage of the rotating electrical machine into a DC voltage supplied to the DC-link, and modulating the grid-side converter to convert a DC-link voltage at the DC-link into an AC output voltage to be supplied to an electrical grid, wherein the machine-side converter is modulated with first optimized pulse patterns, which have been optimized such that a peak value of the (Continued)

DC-link voltage or of a DC-link voltage component of the DC-link voltage is constrained to a predetermined value.

17 Claims, 7 Drawing Sheets

(51) Int. Cl.
  *H02J 3/36* (2006.01)
  *H02J 3/38* (2006.01)

(56) References Cited

U.S. PATENT DOCUMENTS

| | | | |
|---|---|---|---|
| 8,441,820 | B2 | 5/2013 | Shen et al. |
| 2011/0181225 | A1 | 7/2011 | Geyer |
| 2013/0016549 | A1 | 1/2013 | Kieferndorf et al. |
| 2018/0131266 | A1* | 5/2018 | Rohr .................. H02M 1/12 |
| 2018/0309379 | A1 | 10/2018 | Basic et al. |
| 2021/0083597 | A1 | 3/2021 | Hayashi |
| 2021/0328531 | A1* | 10/2021 | Jha .................... H02M 1/088 |

OTHER PUBLICATIONS

European Office Action for Application No. 21169116.7, dated Feb. 19, 2025, 7 pages.
PCT International Search Report and Written Opinion, Application No. PCT/EP2022/060245, dated Aug. 4, 2022, 23 pps.
Ioannis Tsoumas, "Impact of the neutral point potential ripple on the grid side harmonics of a 3LNPC back-to-back converter employed in a medium voltage WECS", 22nd European Conference on Power Electronics and Applications (EPE '20 ECCE Europe), EPE Association, Sep. 7, 2020, 9 pages.
Jun Li et al., "Design, Control and Characteristics of Multilevel Active NPC Converters for High Power Applications", 2010, Retrieved from the Internet: URL:http://search.proquest.com/docview/853068172, XP055095450, 233 pages.
Gerald Scheuer, "Investigation of the 3-level voltage source inverter [VSI] for flexible AC-transmission systems [Facts] exemplified on a static var compensator [SVC]", Dissertation, ETH Zurich, 1997, 425 pages.
Ioannis Tsoumas, "Analysis of the dc-link voltage ripple and its impact on the grid harmonics of a double back-to-back 3LNPC converter system", Technical Report, Jan. 2020, 68 pages.
IEEE Standard 519, "IEEE Recommended Practice and Requirements for Harmonic Control in Electric Power Systems", 2014 (Revision of IEEE Std 519-1992), 29 pages.
Hasmukh S. Patel and Richard G. Hoft, "Generalized Techniques of Harmonic Elimination and Voltage Control in Thyristor Inverters: Part I—Harmonic Elimination", IEEE Transactions Industrial Applications, vol. IA-9, No. 3, May/Jun. 1973, pp. 310-317.
Giuseppe S. Buja, "Optimum Output Waveforms in PWM Inverters", IEEE Transactions Industrial Applications, vol. IA-16, No. 6, Nov./Dec. 1980, pp. 830-836.
Mohamed S. A. Dahidah et al., "A Review of Multilevel Selective Harmonic Elimination PWM: Formulations, Solving Algorithms, Implementation and Applications", IEEE Transactions on Power Electronics, vol. 30, No. 8, Aug. 2015, pp. 4091-4106.
Jackson Lago et al., "Generalized Synchronous Optimal Pulse Width Modulation for Multilevel Inverters", IEEE Transactions on Power Electronics, vol. 32, No. 8, Aug. 2017, pp. 6297-6307.
Vedrana Spudić and Tobias Geyer, "Design of Optimized Pulse Patterns for Reduced Neutral Point Potential Ripple", Technical Report, Aug. 2017, 24 pages.
Satoshi Ogasawara et al., "Analysis of Variation of Neutral Point Potential in Neutral-Point-Clamped Voltage Source PWM Inverters", IEEE Transactions on Industry Applications, Nov. 1993, pp. 965-970.
Qiang Song et al., "A Neutral-Point Potential Balancing Algorithm for Three-Level NPC Inverters Using Analytically Injected Zero-Sequence Voltage", 18th Annual IEEE Applied Power Electronics Conference and Exposition (APEC), Feb. 2003, pp. 228-233.
Chenchen Wang et al., "Analysis and Calculation of Zero-Sequence Voltage Considering Neutral-Point Potential Balancing in Three-Level NPC Converters", IEEE Transactions on Industrial Electronics, vol. 57, No. 7, Jul. 2010, pp. 2262-2271.
Jie Chen et al., "A Neutral-Point Balancing Controller for a Three-Level Inverter With Full Power-Factor Range and Low Distortion", IEEE Transactions on Industry Applications, vol. 49, No. 1, Jan./Feb. 2013, pp. 138-148.
Josep Pou et al., "Fast-Processing Modulation Strategy for the Neutral-Point-Clamped Converter with Total Elimination of Low-Frequency Voltage Oscillations in the Neutral Point", IEEE Transactions on Industrial Electronics, vol. 54, No. 4, Aug. 2007, pp. 2288-2294.
Peter Hokayem et al., "Optimal Current Trajectories for Power Converters with Minimal Common Mode Voltage", IFAC World Congress, Jul. 2017, pp. 2107-2112.
Ioannis Tsoumas, "On the Computation of Optimized Pulse Patterns with Zero Common Mode Voltage", 21st European Conference on Power Electronics and Applications (EPE '19 ECCE Europe), Sep. 2019, Conference Proceedings, 10 pages.
Akshay K. Rathore et al., "Generalized Optimal Pulsewidth Modulation of Multilevel Inverters for Low-Switching-Frequency Control of Medium-Voltage High-Power Industrial AC Drives", IEEE Transactions on Industrial Electronics, vol. 60, No. 10, Oct. 2013, pp. 4215-4224.
Injung Won et al.: "An Optimized Switching Scheme for DC-link Current Ripple Reduction in Three-level T-type Inverter", pp. 3415-3419. May 2017.

* cited by examiner

METHOD FOR CONTROLLING AN ENERGY CONVERSION SYSTEM, ENERGY CONVERSION SYSTEM, CONTROLLER, COMPUTER PROGRAM, AND COMPUTER-READABLE MEDIUM

CROSS REFERENCE TO RELATED APPLICATIONS

This patent application is a National Stage Entry of PCT/EP2022/060245 filed on Apr. 19, 2022, which claims the benefit and priority of European Patent Application No. 21169116.7 filed on Apr. 19, 2021, the disclosures of which are incorporated by reference herein in their entirety as part of the present application.

BACKGROUND

The disclosure relates to the field of energy conversion systems. In particular, the disclosure relates to a method for controlling an energy conversion system, an energy conversion system, a controller for an energy conversion system, a computer program for driving an energy conversion system, and computer-readable medium storing a computer program.

Conventional energy conversion systems, e.g., wind energy conversion systems, e.g., gearless wind energy conversion systems, include converters, e.g., one or more 3-Level Neutral Point Clamped (3LNPC) converter, in order to convert the energy generated by one or more generators of the corresponding energy conversion system such that it is appropriate for being supplied to a grid.

There is an existing problem in corresponding three-level converters. Because of the low fundamental frequency of the generator, which in future may reach values even below 5 Hz, e.g., 3 Hz, strong low frequency oscillations of a corresponding neutral point potential appear in a DC-link of the converter. Due to these oscillations, for a given DC-link capacitance the voltage on the semiconductors in the converter exceeds a permissible value, if the generated power and thus the current that flows in the converter exceed a certain threshold. Furthermore, this low frequency voltage oscillation is transferred to the primary side of the transformer, where it appears as voltage interharmonics. Since the related standards are very stringent on the maximum acceptable values of interharmonics the respective limits are violated for high values of the generator-side modulation index.

One important problem arising, when a high DC-link voltage ripple is present, is related to the requirement that the instantaneous value of the voltage of each half of the DC-link should not exceed the maximum blocking voltage of the semiconductors of the three-level converter. In conventional medium voltage three-level converters, one maximum permissible value may be e.g., 2750 V for a rated average half DC-link voltage of 2500 V. This means that an instantaneous value of an oscillating part should not exceed 250 V. The half DC-link voltage equals the sum or the difference of half the total DC-link voltage and the neutral point potential for the lower and the upper half of the DC-link, respectively. For a typical power level, the peak of half the DC-link voltage can reach several hundreds of Volts for high modulation indices, depending on the Carrier-Based Pulse Width Modulation (CB-PWM) characteristics and the current displacement factor. Apart from the dependence on the CB-PWM characteristics and the displacement factor, the peak instantaneous value is proportional to the amplitude of the fundamental component of the phase current on the converter AC side and inversely proportional to the fundamental frequency on the AC side as well as to the DC-link capacitance. This sets specific limits in the maximum current and the minimum frequency for which the converter operation is allowed for a given current displacement factor and DC-link capacitance.

To reduce the DC-link ripple to an acceptable level it is known to increase the DC-link capacitance. However, this leads to an increased size and increased costs for the converter.

The second important issue that arises when a high neutral point or total DC-link ripple is present on the generator side is related to the generation of interharmonics on the grid-side. The interharmonics appear due to the convolution of the grid-side converter switching function harmonics with the harmonics of the neutral point potential ripple or the total DC-link ripple. The related standards are very stringent on the maximum acceptable values of voltage interharmonics.

These problems are described in detail in the paper "Impact of the neutral point potential ripple on the grid side harmonics of a 3LNPC back-to-back converter employed in a medium voltage WECS" of TSOUMAS IOANNIS, 2020 22ND EUROPEAN CONFERENCE ON POWER ELECTRONICS AND APPLICATIONS (EPE'20 ECCE EUROPE), EPE ASSOCIATION, 7 Sep. 2020 (2020 Sep. 7), XP033835438, DOI: 10.23919/EPE20ECCEEUROPE43536.2020.9215844.

BRIEF DESCRIPTION

Embodiments of the present disclosure provide a method for controlling an energy conversion system, an energy conversion system, a controller for an energy conversion system, a computer program for driving an energy conversion system, and computer-readable medium storing a computer program, which may be carried out and/or produced in a simple and/or cost-efficient way, and/or which contribute to that the energy is supplied to the grid in an accurate, simple, and/or cost-efficient way, and/or to the suppression or avoidance of a generation of interharmonics on the grid-side.

These embodiments are achieved by the subject-matter of the independent claims. Further exemplary embodiments are evident from the dependent claims and the following description.

An embodiment is achieved by a method for controlling an energy conversion system. The system includes a rotating electrical machine, a machine-side converter, a DC-link, and a grid-side converter. The method includes modulating the machine-side converter for converting an AC voltage of the rotating electrical machine into a DC voltage supplied to the DC-link, and modulating the grid-side converter to convert a DC-link voltage at the DC-link into an AC output voltage to be supplied to an electrical grid, wherein the machine-side converter is modulated with first optimized pulse patterns, which have been optimized such that a peak value of the DC-link voltage or of a DC-link voltage component of the DC-link voltage is constrained to a predetermined value.

The machine-side converter may be an active rectifier. The grid-side converter may be an inverter. The machine-side converter and the grid side converter form a converter line, referred to in the following simply as converter. So, a dedicated modulation of a machine-side converter is employed. This enables to provide the converter with a small size, low weight and low costs for a low fundamental frequency and a low displacement factor. The optimized pulse patterns correspond to a specific PWM-method that enables the optimal distribution of harmonic energy across the frequency spectrum based on a user-defined cost-function and constraints. The optimized pulse patterns may be computed in advance and stored in a memory unit of a controller of the energy conversion system. The optimized pulse patterns may be stored as a look-up table, which may be indexed by the AC voltage of the rotating electrical machine, the power factor, and/or the DC-link voltage supplied to the DC-link.

The energy conversion system may be a wind energy conversion system, e.g., a gearless wind energy conversion system. The rotating electrical machine may be a generator, e.g., a synchronous generator, or a motor. The rotating electrical machine may have one or more independent winding systems. The energy conversion system may include a further converter with a further machine-side converter, a further DC-link, and a further grid-side converter. The further converter may be arranged in a further rotating electrical machine winding or in parallel to the converter. At least one of the machine-side converters may be a converter with a neutral point, e.g., a three-level NPC converter, e.g., an active NPC or a T-Type (also known as piloted) converter. At least one of the grid-side converters may be a neutral point clamped converter, e.g., a 3LNPC converter. In the case of two machine windings and two back-to-back converters the energy conversion system may include a wye/delta-wye transformer, which connects the converter(s) to the grid.

According to one or more embodiments, the DC-link voltage component is one of the two halves of the DC-link voltage, the sum of the two halves of the DC-link voltage, or both halves of the DC-link voltage.

According to one or more embodiments the grid-side converter is modulated with second optimized pulse patterns.

According to one or more embodiments, the first and/or the second optimized pulse patterns have been optimized, such that additionally to the peak value of the DC-link voltage or the DC-link voltage component of the DC-link voltage a peak of a neutral point potential, a harmonic of the neutral point potential or of the total DC-link voltage, a total harmonic distortion of a converter current and/or an amplitude of one or more harmonics of an output voltage of the grid-side converter are constrained to a corresponding predetermined value.

According to one or more embodiments, the first and/or the second optimized pulse patterns are determined such that an optimal trade-off between the harmonics of the neutral point potential, and the peak value of the DC-link voltage or of the DC-link voltage component is achieved.

According to one or more embodiments, at least one of the predetermined values is a minimal value.

According to one or more embodiments, the optimized pulse patters have a quarter wave symmetry, a half wave symmetry, or a generic full wave symmetry.

According to one or more embodiments the optimized pulse patterns include at least one negative pulse in a positive half period and a positive pulse in a negative half period of the signal.

According to one or more embodiments the optimized pulse patterns have been optimized such that a modulation index is within the interval from including 0 to 1.27, e.g., from 0.9 to 1.15. This enables the converter operation for a higher output voltage while minimizing the current and the related system losses for a given power.

According to one or more embodiments the optimized pulse patterns include switching angles defining phase angles at which an output level of the machine-side converter is switched.

According to one or more embodiments the optimized pulse patterns are computed for a given phase displacement angle of a fundamental current component, e.g., of a phase current, e.g., of an AC phase current. This enables the converter operation at a very low fundamental frequency with minimized DC-link capacitance.

According to one or more embodiments the optimized pulse patterns are computed offline in advance, stored in a look-up table in a memory unit of the energy conversion system, and determined depending on the characteristic of the AC voltage of the rotating electrical machine. In the look-up table the optimized pulse patterns are associated to characteristics of the AC voltage of the rotating electrical machine.

Another embodiment is achieved by an energy conversion system, including a rotating electrical machine, at least one machine-side converter coupled to the rotating electrical machine, at least one DC-link coupled to the machine-side converter, at least one grid-side converter, which couples the DC-link to a grid, and a controller being configured for controlling the energy conversion system.

It has to be understood that features and/or advantages of the method for controlling the energy conversion system as described above and in the following may be features of the energy conversion system, the controller for the energy conversion system, the computer program for driving the energy conversion system, and/or the computer-readable medium, in which the computer program is stored, as described in the above and in the following.

The energy conversion system may be a wind energy conversion system. The wind energy conversion system may be a gearless wind energy conversion system. The rotating electrical machine may be a generator, e.g., a synchronous generator, or a motor. The rotating electrical machine may have two or more independent winding systems. The energy conversion system may include a further converter with a further machine-side converter, a further DC-link, and a further grid-side converter. The further converter may be arranged at a further machine winding or in parallel to the converter. One or both of the converters each may be a back-to-back converter. One or both of the machine-side converters each may be converter with a neutral point, e.g., a 3LNPC or a 3LANPC. The grid-side converter may be a converter with a neutral point. The energy conversion system may include a wye/delta-wye transformer, which connects the converters to the grid.

Another embodiment is achieved by a controller for the energy conversion system adapted/configured for performing the above method.

Another embodiment is achieved by a computer program for driving the above energy conversion system.

Another embodiment is achieved by a computer-readable medium, e.g., the memory unit, in which the above computer program is stored. The computer-readable medium may be a floppy disk, a hard disk, an USB (Universal Serial Bus) storage device, a RAM (Random Access Memory), a ROM (Read Only Memory), an EPROM (Erasable Programmable Read Only Memory), or a FLASH memory. The computer-readable medium may also be a data communication network, e.g., the Internet, which allows downloading a program code. In general, the computer-readable medium may be a non-transitory or transitory medium.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
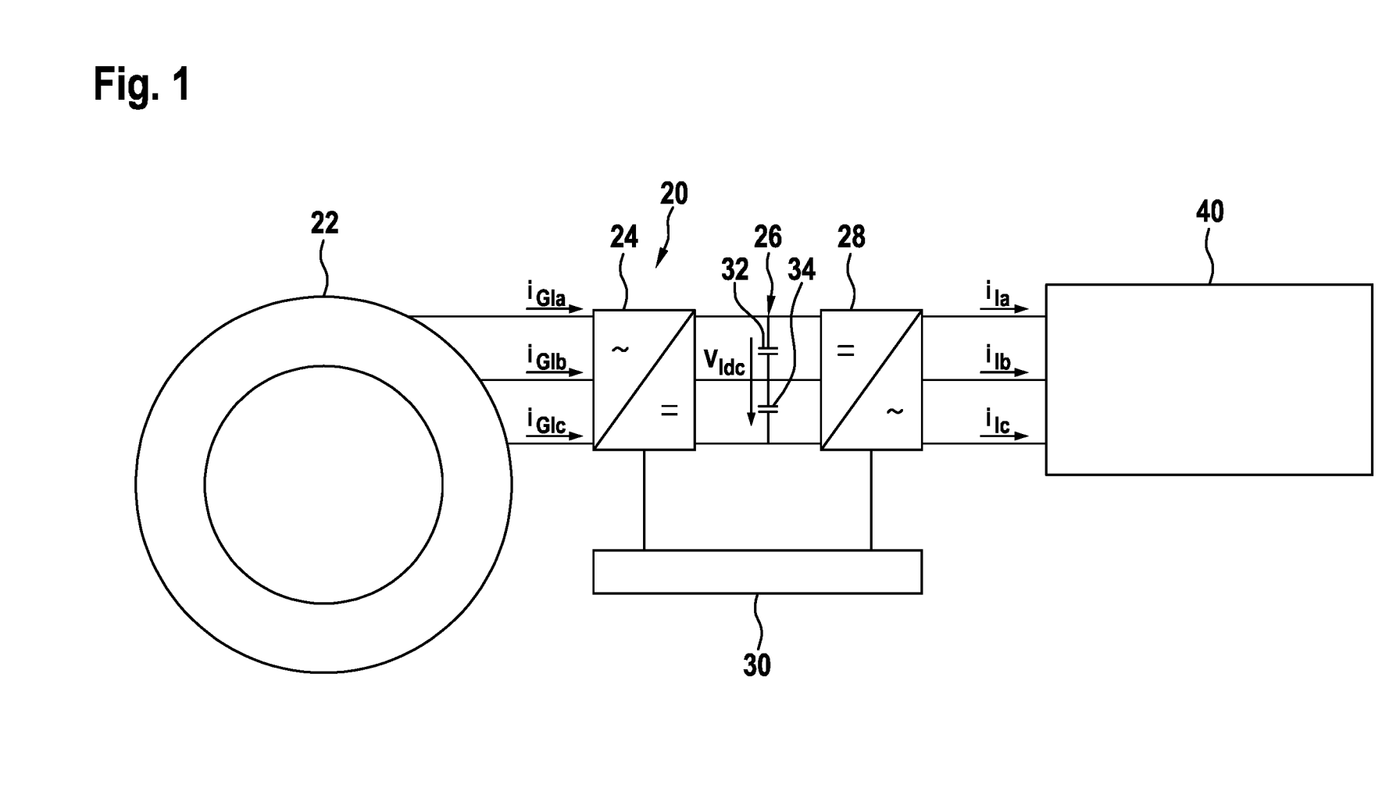
FIG. 1 schematically shows an embodiment of an energy conversion system.

FIG. 1 schematically shows an embodiment of an energy conversion system 20. The energy conversion system 20 may be a wind energy conversion system, e.g., a gearless wind energy conversion system. The energy conversion system 20 includes a rotating electrical machine 22, a machine-side converter 24, a DC-link 26, a grid-side converter 28, a controller 30, and a transformer 40. The machine-side converter 24 and the grid-side converter 28 form a converter line, e.g., a first converter line.

The rotating electrical machine 22 may be generator, e.g., a synchronous generator, or a motor. The machine-side converter 24 may be an active rectifier, if the rotating electrical machine 22 is a generator, or an inverter, if the rotating electrical machine 22 is a motor. The grid-side converter 28 may be an inverter, if the rotating electrical machine 22 is a generator, or a rectifier, e.g., an active rectifier, if the rotating electrical machine 22 is a motor.

In the following it is assumed that the rotating electrical machine 22 is e.g., a generator without loss of generality.

The rotating electrical machine 22 may have two or more independent winding systems. The rotating electrical machine 22, e.g., a first winding system of the rotating electrical machine 22, generates a three-phase input current with partial currents $i_{GIa}$, $i_{GIb}$, $i_{GIc}$. The partial currents $i_{GIa}$, $i_{GIb}$, $i_{GIc}$ are supplied to the machine-side converter 24. The machine-side converter 24 converts the AC voltage of the rotating electrical machine 22 into a DC voltage $V_{Idc}$ supplied to the DC-link 26 and to the grid-side converter 28. The grid-side converter 28 converts the DC voltage $V_{Idc}$ into an AC output voltage providing a three-phase output current with partial currents $i_{Ia}$, $i_{Ib}$, $i_{Ic}$.

The machine-side converter 24, the DC-link 26, and the grid-side converter 28 implement a first converter and may be referred to as first machine-side converter 24, first DC-link 26 and, respectively, first grid-side converter 28. The first converter may be a back-to-back converter. The first machine-side converter 24 may be a converter with a neutral point, e.g. a 3LNPC converter. The first DC-link 26 includes a first capacitor 32 and a second capacitor 34 arranged in series, wherein the node between the first and second capacitor 32, 34 is a neutral point NP of the first converter. The first grid-side converter 28 may be a converter with a neutral point, e.g. a 3LNPC converter. The transformer 40 may be a wye/delta-wye transformer, which connects the first converter to an electrical grid.

The controller 30 is configured for controlling the energy conversion system 20. The controller 30 may include a processor and a computer-readable medium. The computer-readable medium may store a computer program for controlling the energy conversion system 20. Alternatively or additionally, the controller 30 may include a circuitry, e.g. an FPGA or ASIC, which is configured for controlling the energy conversion system 20. The computer-readable medium may be a memory unit of the energy conversion system, e.g., a floppy disk, a hard disk, an USB (Universal Serial Bus) storage device, a RAM (Random Access Memory), a ROM (Read Only Memory), an EPROM (Erasable Programmable Read Only Memory), or a FLASH memory. The computer-readable medium may also be a data communication network, e.g., the Internet, which allows downloading a program code. In general, the computer-readable medium may be a non-transitory or transitory medium.

In particular, the controller 30 is configured for modulating the first machine-side converter 24 and may be the first grid-side converter 28. The controller 30 modulates the first machine-side converter 24 for converting the AC voltage of the rotating electrical machine 22 into the DC voltage $V_{Idc}$ supplied to the first DC-link 26. The controller 30 modulates the first grid-side converter 28 to convert the first DC-link voltage $V_{Idc}$ at the first DC-link 26 into the AC output voltage to be supplied to the transformer 40 and further to the electrical grid. The DC-link voltage $V_{Idc}$ may be referred to as total DC-link voltage.

The first machine-side converter 24 is modulated with optimized pulse patterns, in particular first optimized pulse patterns, which have been optimized such that a DC-link ripple peak value of the first DC-link voltage $V_{Idc}$ or a DC-link voltage component of the DC-link voltage $V_{Idc}$ is constrained to a predetermined value, e.g., a minimal value. In other words, a dedicated modulation of the machine-side converter is employed. For example, the DC-link voltage component is one of the two halves of the DC-link voltage, the sum of the two halves of the DC-link voltage, or both halves of the DC-link voltage. In addition, the first grid-side converter 28 may be modulated by a carrier-based pulse width modulation. Alternatively, the first grid-side converter 28 may be modulated with corresponding optimized pulse patterns.

The first optimized pulse patterns may be optimized such that, in addition to the peak value of the DC-link voltage or the DC-link voltage component of the DC-link voltage a peak of a neutral point potential, a harmonic of the neutral point potential or of the total DC-link voltage, a total harmonic distortion of a converter current and/or an amplitude of one or more harmonics of an output voltage of the first machine-side converter 24 are constrained to a corresponding predetermined value. The first optimized pulse patterns may be determined such that an optimal trade-off between the harmonics of the neutral point potential, and the peak value of the DC-link voltage or of the DC-link voltage component is achieved.

The optimized pulse patterns are specific PWM-methods that enable the optimal distribution of harmonic energy across the frequency spectrum based on a user-defined cost-function and constraints. The optimized pulse patterns may be stored as a look-up table, which maps the first optimized pulse patterns to frequencies of the AC voltage of the rotating electrical machine 22 or the DC voltage supplied to the first DC-link 26. The optimized pulse patterns may be computed in advance and stored in the computer-readable medium. The optimized pulse patterns may be computed for a given current, a given fundamental frequency, a given DC-link capacitance and/or a displacement angle of a fundamental current component. The determination of the optimized pulse patterns is explained in more detail below.

Figure 2:
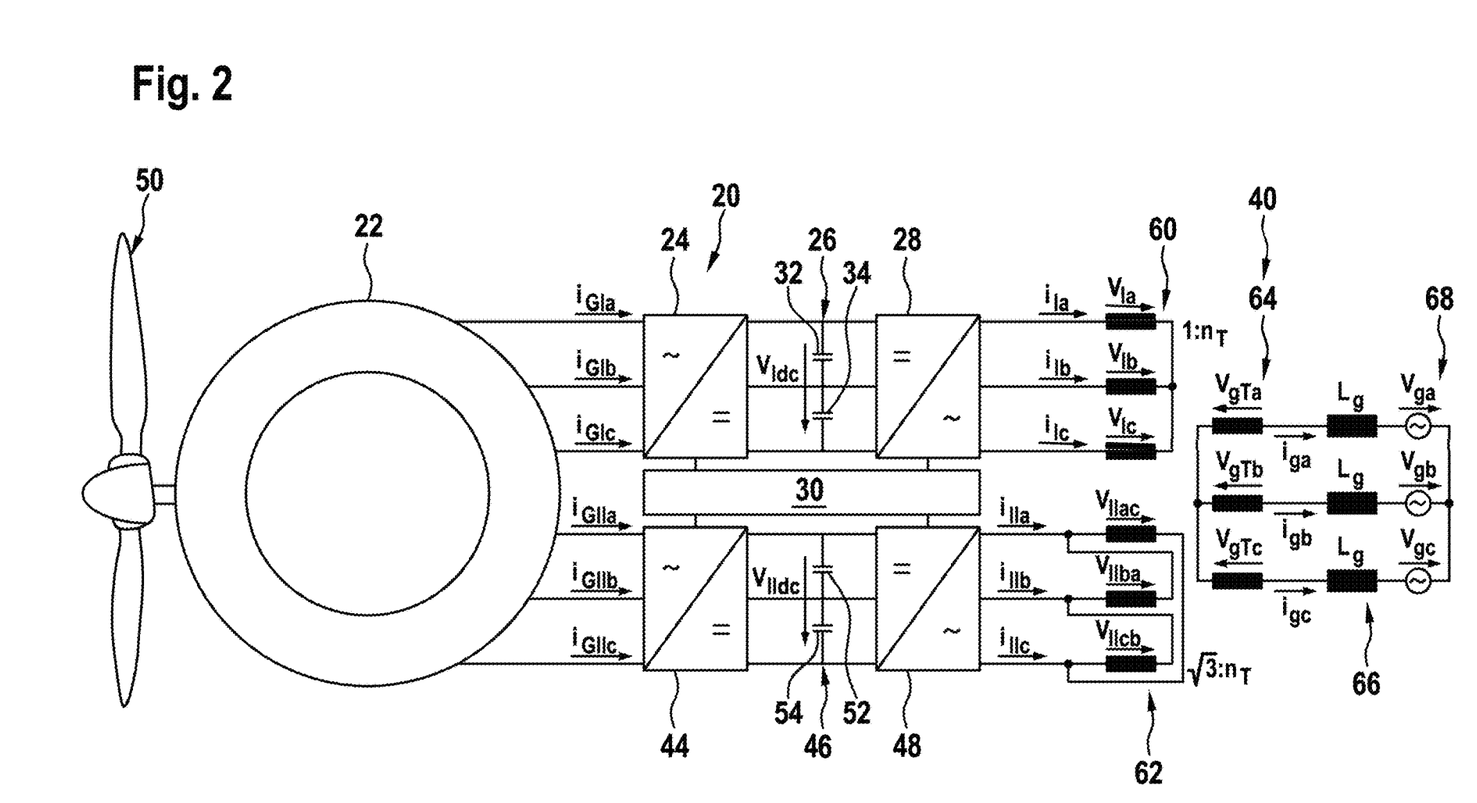
FIG. 2 schematically shows another embodiment of an energy conversion system.

FIG. 2 schematically shows another embodiment of an energy conversion system 20. The energy conversion system 20 may widely correspond to the energy conversion system as explained above. The energy conversion system 20 may be a wind energy conversion system, e.g., a gearless wind energy conversion system, including blades 50 coupled to the rotating electrical machine 22. In the following, only those elements are explained, which are different from the embodiment shown in FIG. 1.

The energy conversion system 20 includes a second converter with a second machine-side converter 44, a second DC-link 46, and a second grid-side converter 48. The second converter may be arranged in a second winding of the rotating electrical machine. The second machine-side converter 44 may be a rectifier, e.g., an active rectifier, if the rotating electrical machine 22 is a generator, or an inverter, if the rotating electrical machine 22 is a motor. The second grid-side converter 48 may be an inverter, if the rotating electrical machine 22 is a generator, or a rectifier, e.g., an active rectifier, if the rotating electrical machine 22 is a motor. At least one of the converters may be a back-to-back converter. At least one of the machine-side converters 24, 44 may be a neutral point clamped converter, e.g., a 3LNPC converter. At least one of the grid-side converters 28, 48 may be a neutral point clamped converter, e.g., a 3LNPC converter. The transformer 40 may be a wye/delta-wye transformer, which connects the converters to the grid.

The rotating electrical machine 22, e.g., a second winding system of the rotating electrical machine 22, generates a three-phase input current with partial currents $i_{GIIa}$, $i_{GIIb}$, $i_{GIIc}$. The partial currents $i_{GIIa}$, $i_{GIIb}$, $i_{GIIc}$ are supplied to the second machine-side converter 44. The second machine-side converter 44 converts the AC voltage of the rotating electrical machine 22 into a second DC voltage $V_{IIdc}$ supplied to the second DC-link 46 and to the second grid-side converter 48. The second grid-side converter 48 converts the second DC voltage $V_{IIdc}$ into an AC output voltage providing a three-phase output current with partial currents $i_{Iia}$, $i_{Iib}$, $i_{Iic}$.

The second machine-side converter 44, the second DC-link 46, and the second grid-side converter 48 implement a second converter. The second converter may be a second back-to-back converter. The second machine-side converter 44 may be a converter with a neutral point, e.g., a 3LNPC converter. The second DC-link 46 includes a third capacitor 52 and a fourth capacitor 54 arranged in series, wherein the node between the third and fourth capacitor 52, 54 is a neutral point NP of the second converter. The second grid-side converter 48 may be a converter with a neutral point, e.g., a 3LNPC converter.

The transformer 40 may correspond to the transformer 40 shown in FIG. 1. The transformer 40 may include first inductors and/or windings 60 connected to the first converter, second inductors and/or windings 62 connected to the second converter, third inductors and/or windings 64 each being coupled to a corresponding inductance 66 acting as AC-terminals 68.

The controller 30 is configured for modulating the second machine-side converter 44 and may be the second grid-side converter 48. The controller 30 modulates the second machine-side converter 44 for converting the AC voltage of the rotating electrical machine 22 into the second DC voltage $V_{IIdc}$ supplied to the second DC-link 46. The controller 30 modulates the second grid-side converter 48 to convert the second DC-link voltage $V_{IIdc}$ at the second DC-link 46 into the AC output voltage to be supplied to the transformer 40 and further to the electrical grid. The second machine-side converter 44 is modulated with optimized pulse patterns, in particular second optimized pulse patterns, which have been optimized such that a DC-link ripple peak value of the second DC-link voltage $V_{IIdc}$ or a DC-link voltage component of the DC-link voltage is constrained to a predetermined value, e.g., a minimal value. For example, the DC-link voltage component is one of the two halves of the DC-link voltage, the sum of the two halves of the DC-link voltage or both halves of the DC-link voltage. In other words, a dedicated modulation of the machine-side converter is employed. In addition, the second grid-side converter 48 may be modulated by a carrier-based pulse width modulation. Alternatively, the grid-side converter 48 may be modulated with corresponding optimized pulse patterns.

The second optimized pulse patterns may be optimized such that, in addition to the peak value of the DC-link voltage or the DC-link voltage component of the DC-link voltage a peak of a neutral point potential, a harmonic of the neutral point potential or of the total DC-link voltage, a total harmonic distortion of a converter current and/or an amplitude of one or more harmonics of an output voltage of the second machine-side converter 44 are constrained to a corresponding predetermined value. The second optimized pulse patterns may be determined such that an optimal trade-off between the neutral point ripple, and the DC-link voltage or the DC-link voltage component is achieved. The second optimized pulse patterns may be stored as a look-up table, which maps the optimized pulse patterns to frequencies of the AC voltage of the rotating electrical machine 22 or the DC voltage supplied to the second DC-link 46. The second optimized pulse patterns may be computed in advance and stored in the computer-readable medium. The second optimized pulse patterns may be computed for a given current, a given fundamental frequency, a given DC-link capacitance and/or a displacement angle of a fundamental current component. The determination of the second optimized pulse patterns in explained in more detail below.

Figure 3:
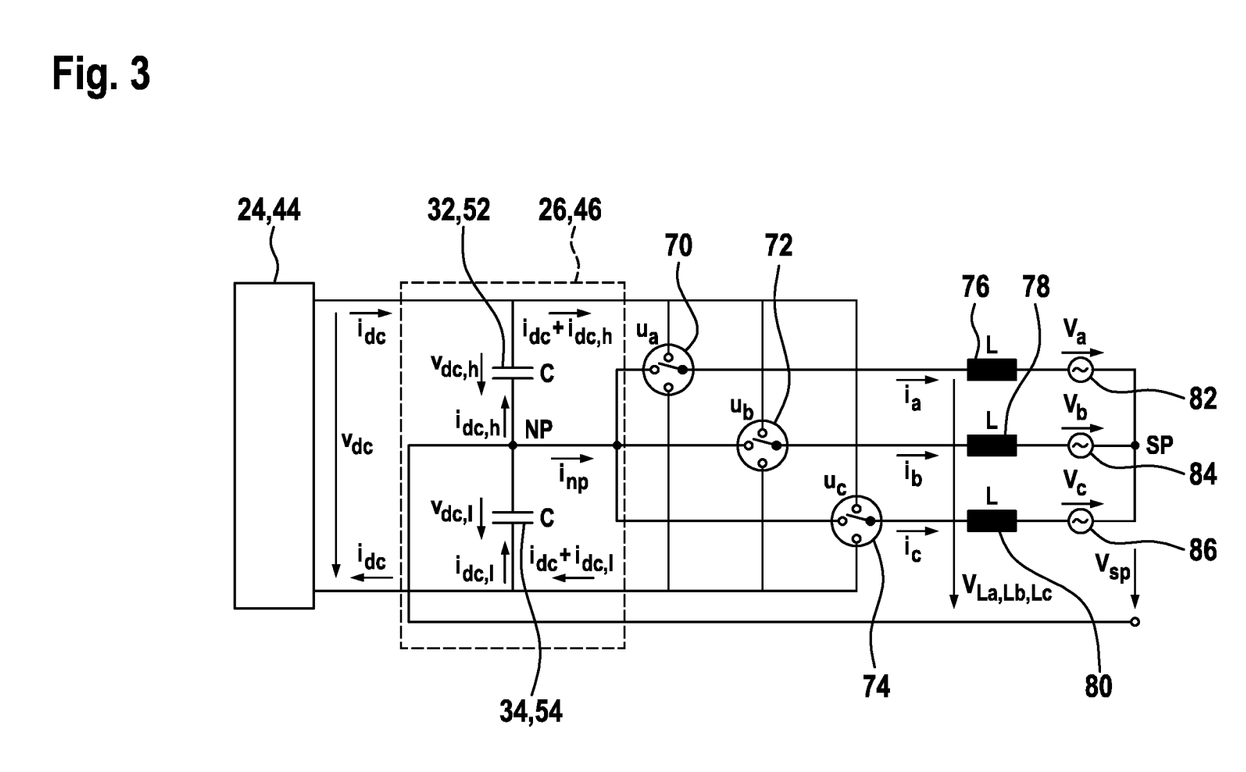
FIG. 3 schematically shows a circuit diagram of an embodiment of a converter.

FIG. 3 schematically shows a circuit diagram of an embodiment of a converter. The converter may include the first or second machine-side converter 24, 44 and/or, respectively, the first, second, third, and/or fourth capacitor 32, 34, 52, 54. The converter may further include a first switch 70, a second switch 72, a third switch 74, a first inductance 76, a second inductance 78, a third inductance 80, a first AC-terminal 82, a second AC-terminal 84, and a third AC-terminal 86.

For computing the optimized pulse patterns, firstly the converter may be modelled, as explained in the following:

It is assumed that DC-link capacitances C, i.e., the capacitances of capacitors 32, 34, 52, 54, are identical. In the following, the integer variable $u_x \in \{-1, 0, 1\}$ denotes the switch position in the phase leg x, with $x \in \{a, b, c\}$. This variable is referred to as switching function. The voltages of the three phases referred to the neutral point NP are given by the integer variable $u_x \in \{-1, 0, 1\}$, which denotes the switch position in the phase leg x, with $x \in \{a, b, c\}$. This variable is referred to as switching function. The voltages of the three phases referred to the neutral point NP are given by:

$$v_x(t) = \begin{cases} v_{dc,h}(t), & u_x(t) = 1 \\ 0, & u_x(t) = 0 \\ v_{dc,l}(t), & u_x(t) = -1 \end{cases} \quad (1)$$

The current- and voltage-equations on the DC-side are as follows:

The total instantaneous DC-link voltage is:

$$v_{dc}(t) = v_{dc,h}(t) + v_{dc,l}(t) \quad (2)$$

The NP potential is given by:

$$v_{np}(t) = \frac{1}{2}[v_{dc,l}(t) - v_{dc,h}(t)] \quad (3)$$

and it evolves as a function of the neutral point current $i_{np}(t)$ according to:

$$\frac{dv_{np}}{dt} = \frac{1}{2}\left[\frac{dv_{dc,l}(t)}{dt} - \frac{dv_{dc,h}(t)}{dt}\right] = \quad (4)$$

$$-\frac{1}{2}\left[\frac{1}{C}i_{dc,l}(t) - \frac{1}{C}i_{dc,h}(t)\right] = -\frac{1}{2C}[i_{dc,l}(t) - i_{dc,h}(t)] =$$

$$-\frac{1}{2C}i_{np}(t) \Rightarrow v_{np}(t) - \frac{1}{2C}\int_0^t i_{np}(\tau)d\tau + v_{np}(0) \Rightarrow v - np(\theta) =$$

$$-\frac{1}{2\omega C}\int_0^\theta i_{np}(\zeta)d\zeta + v_{np}(0)$$

In (4) $v_{np}$ is given as a function of the electrical angle $\theta = \omega t$. The NP current can be calculated from the AC currents according to:

$$i_{np}(t) = \Sigma_{x \in \{a,b,c\}}(1 - |u_x(t)|)i_x(t), \text{ with } x \in \{a, b, c\} \quad (5)$$

Assuming $\Sigma_{x \in \{a,b,c\}} i_x(t) = 0$ (which holds for delta connected load or wye connected load with floating point), we rewrite (5) as:

$$i_{np}(t) = -\Sigma_{x \in \{a,b,c\}}|u_x(t)|i_x(t) \quad (6)$$

The currents of the upper and lower side of the DC-link 26, 46 are computed as in using:

$$i_{dc}(t) + i_{dc,h}(t) = \quad (7.a)$$

$$\Sigma_{x \in \{a,b,c\}} u_x(t)\frac{u_x(t)+1}{2}i_x(t) = \frac{1}{2}\Sigma_{x \in \{a,b,c\}}|u_x(t)|i_x(t) + \frac{1}{2}\Sigma_{x \in \{a,b,c\}}u_x(t)i_x(t)$$

and $$i_{dc}(t) + i_{dc,h}(t) = -\Sigma_{x \in \{a,b,c\}}u_x(t)\frac{u_x(t)-1}{2}i_x(t) = \quad (7.b)$$

$$-\frac{1}{2}\Sigma_{x \in \{a,b,c\}}|u_x(t)|i_x(t) + \frac{1}{2}\Sigma_{x \in \{a,b,c\}}u_x(t)i_x(t)$$

which by subtracting $i_{dc}$ gives:

$$i_{dc,h}(t) = \frac{1}{2}\Sigma_{x \in \{a,b,c\}}u_x(t)i_x(t) + \frac{1}{2}\Sigma_{x \in \{a,b,c\}}|u_x(t)|i_x(t) - i_{dc}(t), \text{ and} \quad (8.a)$$

$$i_{dc,l}(t) = \frac{1}{2}\Sigma_{x \in \{a,b,c\}}u_x(t)i_x(t) + \frac{1}{2}\Sigma_{x \in \{a,b,c\}}|u_x(t)|i_x(t) - i_{dc}(t) \quad (8.b)$$

The capacitor voltages are given by:

$$v_{dc,h}(t) = -\frac{1}{C}\int_0^t i_{dc,h}(\tau)d\tau + v_{dc,h}(0) \Rightarrow v_{dc,h}(\theta) = -\frac{1}{\omega C} \quad (9.a)$$

$$\int_0^\theta \left[\Sigma_{x \in \{a,b,c\}}|u_x(\zeta)|i_x(\zeta) + \frac{1}{2}\Sigma_{x \in \{a,b,c\}}u_x(\zeta)i_x(\zeta) - i_{dc}(\zeta)\right]d\zeta + v_{dc,h}(0)$$

and $$v_{dc,l}(t) = -\frac{1}{C}\int_0^t i_{dc,l}(\tau)d\tau + v_{dc,l}(0) \Rightarrow v_{dc,l}(\theta) = -\frac{1}{\omega C} \quad (9.b)$$

$$\int_0^\theta \left[-\frac{1}{2}\Sigma_{x \in \{a,b,c\}}|u_x(\zeta)|i_x(\zeta) + \frac{1}{2}\Sigma_{x \in \{a,b,c\}}u_x(\zeta)i_x(\zeta) - i_{dc}(\zeta)\right]d\zeta + v_{dc,l}(0)$$

Finally, from (2) and (8) the total DC-link voltage can be calculated:

$$v_{dc}(t) = v_{dc,h}(t) + v_{dc,l}(t) \Rightarrow v_{dc}(\theta) = \quad (10)$$

$$\frac{1}{\omega C}\int_0^\theta [-\Sigma_{x \in \{a,b,c\}}u_x(\zeta)i_x(\zeta) + 2i_{dc}(\zeta)]d\zeta + v_{dc}(0)$$

By reformulating (2) and (3) the capacitor voltages can be also expressed as:

$$v_{dc,h}(t) = \frac{v_{dc}(t)}{2} - v_{np}(t) \quad (11.a)$$

$$v_{dc,l}(t) = \frac{v_{dc}(t)}{2} + v_{np}(t) \quad (11.b)$$

The voltage equations on the AC side are as follows:

The general equation for the derivation of the output voltages of the 3LNPC converter depicted in FIG. 2 is given by:

$$v_x(t) = \frac{u_x(t)[(u_x(t)+1]}{2} \cdot v_{dc,h}(t) - \frac{u_x(t)[(u_x(t)-1]}{2} \cdot v_{dc,l}(t), \quad (12)$$

with $x \in \{a, b, c\}$

The above equation can be rearranged as follows:

$$v_x(t) = \frac{u_x(t)}{2}[v_{dc,h}(t) + v_{dc,l}(t)] + \frac{[u_x(t)]^2}{2}[v_{dc,h}(t) - v_{dc,l}(t)], \quad (13)$$

with $x \in \{a, b, c\}$

With the help of (2) and (3) and after substituting $[u_x(t)]^2$ with $|u_x(t)|$ we can rewrite (13) as:

$$v_x(t) = u_x(t) \cdot \frac{v_{dc}(t)}{2} - |u_x(t)| \cdot v_{np}(t), \text{ with } x \in \{a, b, c\} \quad (14)$$

The first part of (14) expresses the part of the output voltage of the converter, which is the product of the corresponding switching function and the half of the DC-link voltage. This term is the same with a two-level converter. The second part of (14) expresses an additional term in the output voltage, which is often neglected: the product of the absolute value of the switching function with the NP potential. From (14) and recalling that a product in the time domain is convolution in the frequency domain it may be concluded that the harmonics of the total DC-link voltage $V_{dc}$ are convoluted with the harmonics of the switching function $u_x$, whereas the harmonics of the NP potential $V_{np}$ are convoluted with the harmonics of the absolute value of the switching function $|u_x|$.

When a high DC-link ripple is present, the instantaneous value of the voltage of each half of the DC-link should not exceed the maximum blocking voltage of the semiconductors of the converter. One permissible maximum value may be e.g., 2750 V for a rated average half DC-link voltage of 2500 V. This means that the instantaneous value of the oscillating part should not exceed 250 V. The half DC-link voltage equals the sum or the difference of half the total DC-link voltage and the NP potential for the lower and the upper half or the DC-link respectively, as described by (11).

Figure 4:
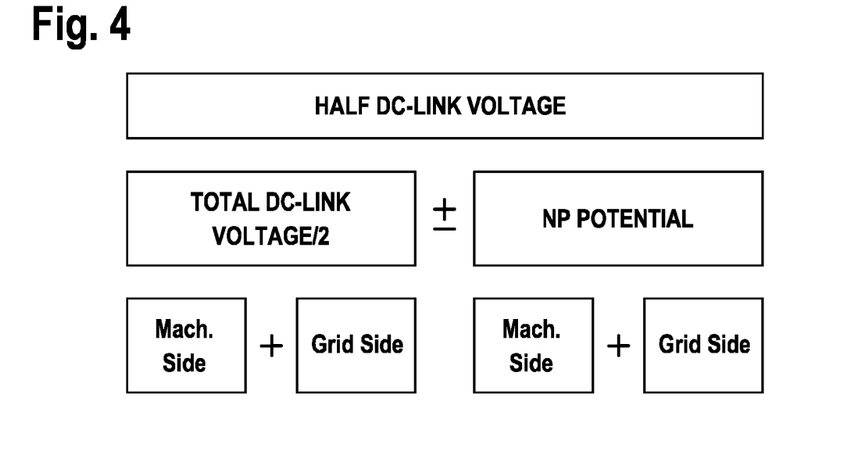
FIG. 4 schematically shows an example of DC-link voltage ripple components in a converter in accordance with one embodiment of the present disclosure.

FIG. 4 schematically shows an example of DC-link voltage ripple components in a converter in accordance with one embodiment of the present disclosure. The converter may be one of the above converters, e.g., the converter shown in FIG. 3. FIG. 4 summarizes different contributions to the DC-link voltage ripple for the converter. As can be observed, both converter sides (i.e., machine, grid) contribute to the ripple of half the DC-link voltage. The machine-side is more crucial, because of the very low fundamental frequency. In particular, for the standard Carrier-Based Pulse Width Modulation (CB-PWM) the highest contribution comes from the machine-side Neutral Point (NP) ripple, which can reach very high values. This ripple is dominated by a 3rd harmonic component which increases significantly with the modulation index and most importantly with the displacement angle of the fundamental component of the phase current.

Figure 5:
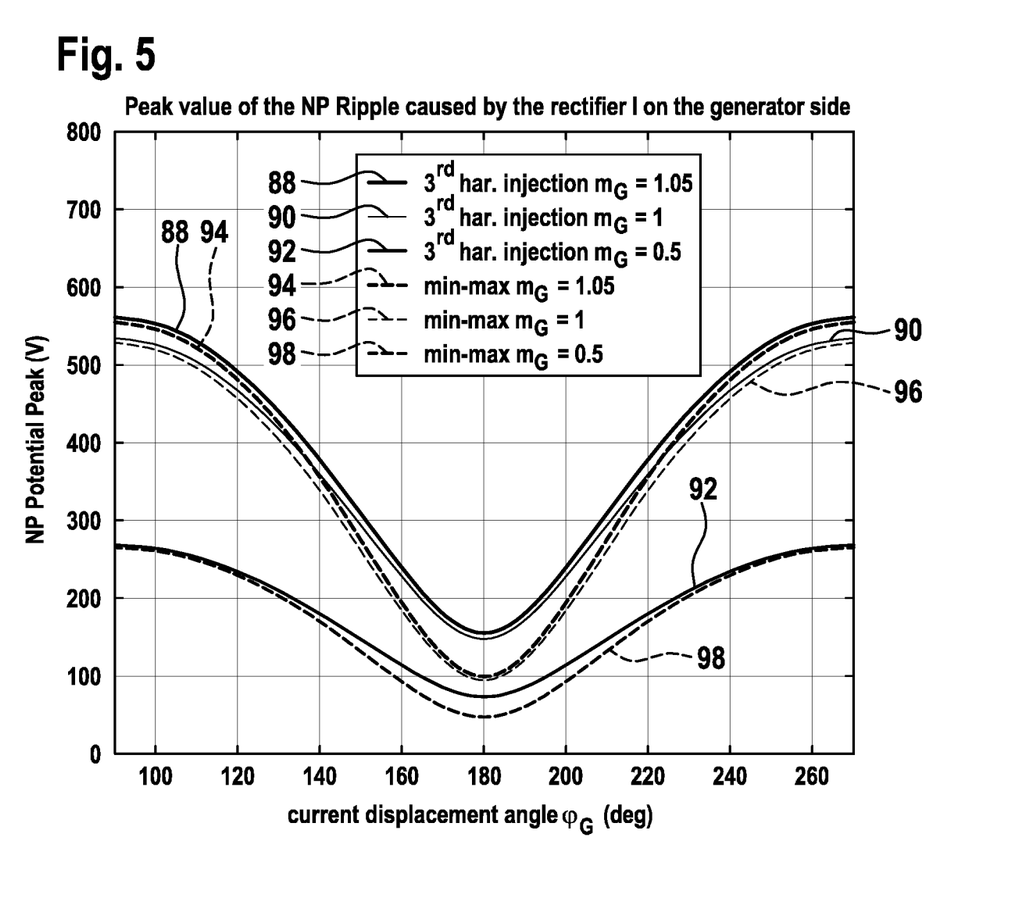
FIG. 5 schematically shows examples of peak values of neutral point voltage ripple in a converter in accordance with one embodiment of the present disclosure.

FIG. 5 schematically shows examples of peak values of neutral point voltage ripple in a converter in accordance with one embodiment of the present disclosure, e.g., in the converter shown in FIG. 3. As can be seen in FIG. 5, at a typical power level of the converter the peak of half the DC-link voltage can reach several hundreds of Volts for high modulation indices.

Two typical ways to generate the CB-PWM reference are considered: injection of a 3rd harmonic with an amplitude of ⅙ times the amplitude of the sinusoidal reference and injection of a Common Mode (CM) component equal to the average of the maximum and the minimum value of the converter reference voltages in the three phases. If the rotating electrical machine 22 is a permanent magnet synchronous generator, which is typically used in gearless Wind Energy Conversion System (WECS), e.g. the energy conversion system 20, the current displacement angle at the rated operating point may be close to 140 degrees, with the direction of the currents being shown in FIGS. 1, 2, and 3, what means that for a modulation index above 1 the peak value of the ripple is e.g. above 300 V. This already exceeds the permissible value e.g., of 250 V, without even considering the contributions of the grid-side converter to the peak instantaneous value.

Apart from the dependence on the CB-PWM reference characteristics and the displacement factor, the peak instantaneous value is proportional to the amplitude of the fundamental component of the phase current on the converter AC side and inversely proportional to the fundamental frequency on the AC side as well as to the DC-link capacitance. This sets specific limits in the maximum current and the minimum frequency for which the converter operation is allowed for a given current displacement factor and the DC-link capacitance. To exceed these limits a reduction of the peak value of the ripple is necessary.

A further important issue that arises when a high NP or total DC-link ripple is present on the machine-side is related to the generation of interharmonics on the grid-side. Based on (14) the voltage harmonics at the output of the grid side converters can be sorted into three categories:

1. The harmonics that arise from the convolution of the switching function $u_x$ with the average value of the total DC-link voltage $V_{dc}$ (divided by 2). These are the harmonics of the switching function $u_x$ of the grid-side converter multiplied by a constant factor. The product of $V_{dc}/2$ with the fundamental component of $u_x$ yields the desired fundamental voltage component.
2. The harmonics that appear due to the convolution of $u_x$ with the harmonics of the total DC-link voltage $v_{dc}$ divided by two. Some of the latter harmonics come from the machine-side converter and some other from the grid-side converter.
3. The harmonics that appear due to the convolution of $|u_x|$ with the harmonics of the NP potential $v_{NP}$. Some of the latter harmonics come from the machine-side converter and some other from the grid-side converter.

Since the machine-side harmonics appear in general at frequencies which are not multiples of the grid fundamental frequency, the resulting harmonics will be interharmonics. The related standards are very stringent on the maximum acceptable values of voltage interharmonics. It is thus important to keep the peak value of the related NP or total DC-link very low, otherwise compliance to the standards is impossible. Apart from compliance to standards the interharmonics should be eliminated in frequency ranges that coincide with resonance frequencies of the grid impedance.

Therefore, the converter at the machine-side, e.g., the machine-side converter 24, 44, is modulated with the offline computed first Optimized Pulse Patterns (OPPs), also known as synchronous optimal PWM. The first and second OPPs are specific PWM methods that enable the optimal distribution of harmonic energy across the frequency spectrum based on a user-defined cost-function and constraints. In contrast to classical CB-PWM, improved current ripple can be achieved for inductive loads. For the computation of multi-level OPPs only different levels of the corresponding waveform are typically considered without any special considerations of the type (cascaded H-bridge, modular multi-level converter etc.) and the individual characteristics (voltage level, pulse numbers, fundamental components) of the different stages of the converter.

In the present disclosure, the OPP switching angles are computed such that the peak value of the DC-link voltage or of a DC-link voltage component of the DC-link voltage of the converter is minimized or constrained to a very low value. This is achieved for a given current, fundamental frequency, DC-link capacitance and/or displacement angle of the fundamental current component and enables the converter operation at very low fundamental frequency with very low, e.g., minimized DC-link capacitance. The half DC-link ripple can be computed from the NP ripple and the total DC-link ripple, as described in (11). The NP ripple and the total DC-link ripple can be computed from the OPP switching angles and the corresponding switching transition.

An OPP is a switching function described by its switching angles:

$$\theta_1, \theta_2, \ldots, \theta_N \le 2\pi, \text{ and} \qquad (15.a)$$

the corresponding switching transitions $$\Delta u_1, \Delta u_2, \ldots, u_N \in \{-1, 0, 1\}, \qquad (15.b)$$

where N is the number of switching angles within one fundamental period. As an example, three-level OPPs with an initial value u(0)=0 and N=2 k, k∈N, are considered. The latter is necessary to have $u(\theta)=u(2\pi+\theta)$. Typically, when using OPPs a quarter-wave even symmetry is considered in addition to the half-wave odd symmetry.

Figure 6:
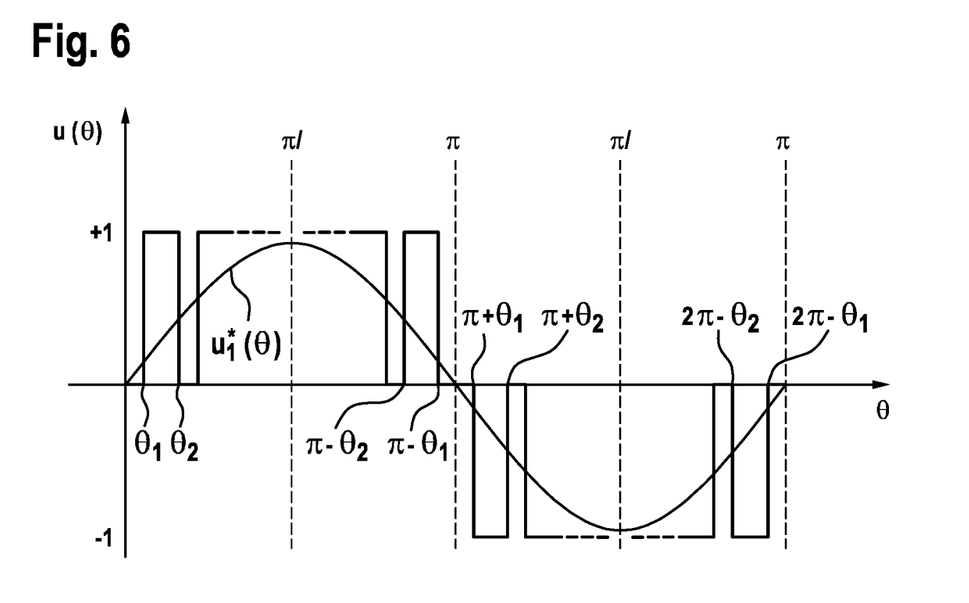
FIG. 6 schematically shows an example of optimized pulse patterns in accordance with one embodiment of the present disclosure.

FIG. 6 schematically shows an example of OPPs in accordance with one embodiment of the present disclosure. The shown OPP has a quarter wave symmetry. Alternatively, the OPPs may have a half wave symmetry or a generic full wave symmetry. The OPPs include the switching angles $\theta_1$, $\theta_2$, ..., $\theta_N$ defining phase angles at which an output level of the machine-side converter is switched. The quarter-wave and half-wave symmetries are expressed by the following two conditions respectively:

$$u(\theta) = u(\pi - \theta) \forall \theta \in \left[0, \frac{\pi}{2}\right] \qquad (16.a)$$

$$u(\theta) = -u(\pi + \theta) \forall \theta \in [0, \pi] \qquad (16.b)$$

Furthermore, a three-phase symmetry is typically assumed which is expressed as:

$$u_a(\theta) = u(\theta) \qquad (16.c)$$

$$u_b(\theta) = u\left(\theta - \frac{2\pi}{3}\right) \qquad (16.d)$$

$$u_c(\theta) = u\left(\theta - \frac{2\pi}{3}\right) \qquad (16.e)$$

Considering the quarter wave symmetry, the OPP switching function is described by the following switching angles and corresponding switching transitions:

$$\theta_1, \theta_2, \ldots, \theta_d, 0 \le \theta_i \le \pi/2 \text{ and} \qquad (17.a)$$

the corresponding switching transitions $$\Delta u_1, \Delta u_2, \ldots, \Delta u_d, \Delta u_i \in \{-1, 1\}, \qquad (17.b)$$

where d is the number of switching angles within one quarter of the fundamental period.

The pulse number of the OPP, which is defined as the number of switching cycles in one fundamental period, is equal to d.

Although, for easiness in exposition, the derivation and minimization of the NP ripple for half-wave symmetric pulse patterns is considered, the results can readily be transferred to generic OPPs with no symmetry requirements.

Using the definition of Fourier series the following approximation for the OPP switching function in the general case (no quarter-wave or half-wave symmetries) can be obtained:

$$u(\theta) = \frac{\alpha_0}{2} + \Sigma_{v \in \mathbb{N}} \alpha_v \cos(v\theta) + \Sigma_{v \in \mathbb{N}} b_v \sin(v\theta), \qquad (18.a)$$

where $$a_0 = -\frac{1}{\pi} \sum_{i=1}^{N} \Delta u_i \theta_i, \qquad (18.b)$$

$$a_v = -\frac{1}{v}\frac{1}{\pi} \sum_{i=1}^{N} \Delta u_i \sin \theta_i, \text{ and} \qquad (18.c)$$

$$b_v = \frac{1}{v}\frac{1}{\pi} \sum_{i=1}^{N} \Delta u_i \cos v \theta_i. \qquad (18.d)$$

where $\theta \in [-\pi, \pi]$.

In the case of quarter-wave symmetry (18) reduces to:

$$u_a(\theta) = \Sigma_{v \in (1+2k), k \in \mathbb{N}_0} b_v \sin(v\theta), \text{ where} \qquad (19.a)$$

$$b_v = \frac{1}{v}\frac{4}{\pi} \sum_{i=1}^{d} \Delta u_i \cos \theta_i \qquad (19.b)$$

where $\theta \in [0, \pi/2]$.

The amplitude of the switching functions $u_b$ and $u_c$ is also given by (19.b), but their phase is equal to $-v \cdot 2\pi/3$ and $v \cdot 2\pi/3$ respectively. The absence of even harmonics in $u_a(\theta)$ is a direct consequence of the half-wave symmetry of the switching function $u(\theta)$, as described by (16.b). A quarter-wave symmetry is not necessary for the elimination of the even harmonics. When having in addition a quarter-wave symmetry all the coefficients $a_v$ are zero. The coefficients $b_v$ can take positive or negative values. The latter means that the corresponding harmonic lags by $\pi$. The harmonics with orders which are multiple of 3 have the same phase in all three phases a, b and c, which means that they are common mode (CM) harmonics. The harmonics with orders $|1\pm6k|$, $k\in \mathbb{N}$, are differential mode (DM) harmonics. The amplitude of the fundamental harmonic of the switching function is referred to as modulation index.

The OPP switching function is an odd function, owing to the imposed symmetry (16.b). Its absolute value is an even function since $|u(\theta)|=|u(-\theta)|$ and its period is half of the period of $u(\theta)$. For a quarter wave symmetry, the Fourier approximation of the absolute value of the switching function is:

$$|u_a(\theta)| = \frac{\alpha_0}{2} + \Sigma_{v\in 2k, k\in \mathbb{N}}\, a_v \cos(v\theta), \quad (20.\text{a})$$

where $$a_v = -\frac{1}{v}\frac{4}{\pi}\sum_{i=1}^{d} \Delta u_i \sin v\theta_i,\ v > 0, \text{ and} \quad (20.\text{b})$$

$$a_0 = -\frac{4}{\pi}\sum_{i=1}^{d} \Delta u_i \theta_i + 2u_a(\pi/2), \quad (20.\text{c})$$

where $\theta \in [0, \pi/2]$.

For the considered 3 L OPPs we have:

$$u_a\left(\frac{2}{\pi}\right) = \begin{cases} 0, d=2k, k\in \mathbb{N} \\ 1, d=2k+1, k\in \mathbb{N}_0 \end{cases} \quad (21.\text{a})$$

which can also be expressed as [9]:

$$u_a\left(\frac{\pi}{2}\right) = d - 2\left\lfloor \frac{d}{2} \right\rfloor \quad (21.\text{b})$$

The absence of odd harmonics in (21.a) is a direct consequence of the half-wave symmetry of the switching function $u(\theta)$, as described by (16.b). The coefficients $a_v$ can take positive or negative values, which means that the corresponding harmonic leads by $\pi/2$ or lags by $\pi/2$ the fundamental sine harmonic of the output voltage respectively.

The ripple of the NP potential for modulation with OPPs can be calculated by (4) and (6). Considering only the fundamental harmonic of symmetrical three-phase phase currents and OPPs with a symmetry as imposed by (17) get from (6) and (21) for the NP current of one converter [9]:

$$i_{Gnp}(\theta) = \frac{3I_G}{2}\Sigma_{v\in 6k+3, k\in \mathbb{N}_0} \quad (22.\text{a})$$

$$[(a_{v+1} - a_{v-1})\cos(\varphi_G)\sin(v\theta) - (a_{v+1} + a_{v-1})\sin(\varphi_G)\cos(v\theta)]$$

$$\text{assuming } i_{Ga}(\theta) = I_G \cdot \sin(\theta + \varphi_G) \quad (22.\text{b})$$

$$i_{Gb}(\theta) = I_G \cdot \sin\left(\theta + \varphi_G - \frac{2\pi}{3}\right) \quad (22.\text{c})$$

$$i_{Gc}(\theta) = I_G \cdot \sin\left(\theta + \varphi_G + \frac{2\pi}{3}\right) \quad (22.\text{d})$$

As can be seen from (22) only harmonics with orders 3, 9, 15, 21, . . . appear in the neutral point current. From (4) and (22) one can calculate the harmonics of the NP ripple:

$$v_{Gnp}(\theta) = \frac{3I_G}{4\omega_G C}\Sigma_{v\in 6k+3, k\in \mathbb{N}_0}\frac{1}{v}[(a_{v+1}-a_{v-1})\cos(\varphi_G)\cos(v\theta) + \quad (23)$$

$$(a_{v+1}+a_{v-1})\sin(\varphi_G)\sin(v\theta)] + v_{gInp}(0),$$

where the coefficients $a_{v+1}$ and $a_{v-1}$ are given by (20.b).

The total DC-link voltage can be calculated from (10) after calculating the integrand. If one considers only fundamental harmonics of the currents the integrand of (10) is equal to:

$$-\Sigma_{x\in\{a,b,c\}}u_x(\theta 4)i_x(\theta) + 2i_{dc}(\theta) = -\frac{3I_G}{2}\Sigma_{v\in 6k, k\in \mathbb{N}} \quad (24)$$

$$[(b_{v+1}-b_{v-1})\cos(\varphi_G)\cos(v\theta) + (b_{v+1}+b_{v-1})\sin(\varphi_G)\sin(v\theta)],$$

where the coefficients $b_{v+1}$ and $b_{v-1}$ are given by (20.b).

If the term $2i_{dc}(\theta)$ contains only a constant dc component, then this component is cancelled by the term coming from the convolution of the fundamental harmonic of the switching function:

$$\Sigma_{x\in\{a,b,c\}}u_{x,1}(\theta)i_x(t) = \frac{3I_G}{2}m_G \cos(\varphi_G) = 2i_{dc} \quad (25)$$

Considering (25) the total DC-link voltage is calculated by (10) and (24) as follows:

$$v_{Gdc}(\theta) = \frac{3I_G}{2\omega_G C}\Sigma_{v\in 6l, l\in \mathbb{N}}\frac{1}{v}[-(a_{v+1}-a_{v-1})\cos(\varphi_G)\sin(v\theta) + \quad (26)$$

$$(a_{v+1}+a_{v-1})\sin(\varphi_G)\cos(v\theta)] + v_{gIdc}(0),$$

As can be seen in (26) only harmonics with orders 6, 12, 18, 24, . . . appear in the total DC-link voltage.

Equations (23) and (26) describe the harmonic components that are present in the half DC-link voltage. In the present disclosure, not only one or more harmonic components of the half DC-link voltage ripple are minimized, but the resulting peak value is minimized. With the help of an optimization algorithm suitable switching angles are computed in order to achieve this objective. In the optimization algorithm the half DC-link ripple for given switching angles is calculated either numerically from (4)-(11) or via approximate analytical expressions which are based on (23) and (26).

Figure 7:
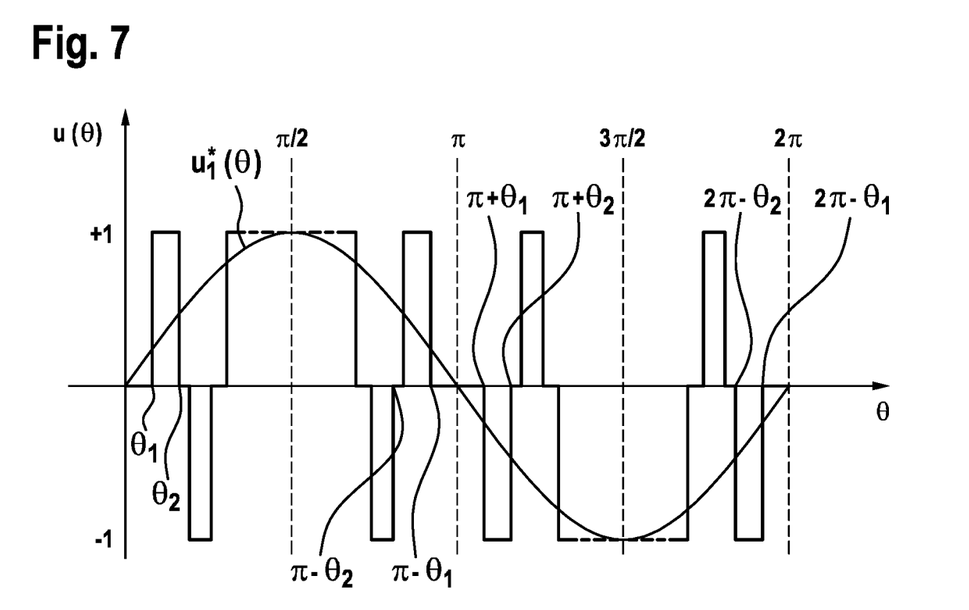
FIG. 7 schematically shows an example of optimized pulse patterns in accordance with one embodiment of the present disclosure.

FIG. 7 schematically shows another example of optimized pulse patterns in accordance with one embodiment of the present disclosure. The shown optimized pulse pattern includes negative pulses in the positive half period and positive pulses in the negative half period of the signal.

Figure 8:
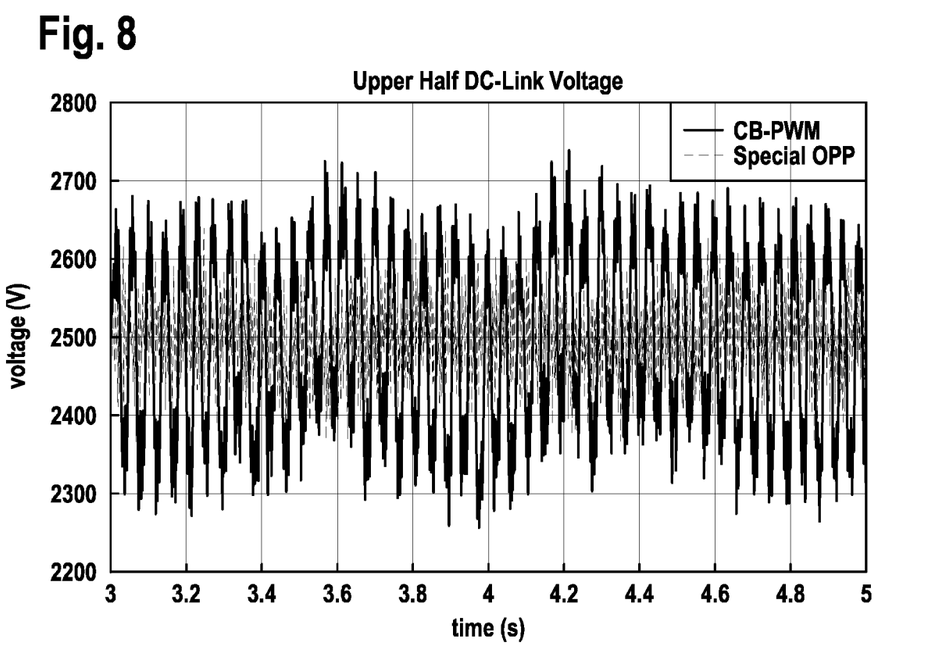
FIG. 8 schematically shows a comparison of waveforms of an upper half DC-link voltage resulting from a carrier-based pulse width modulation resulting from optimized pulse patterns in accordance with one embodiment of the present disclosure.
Figure 9:
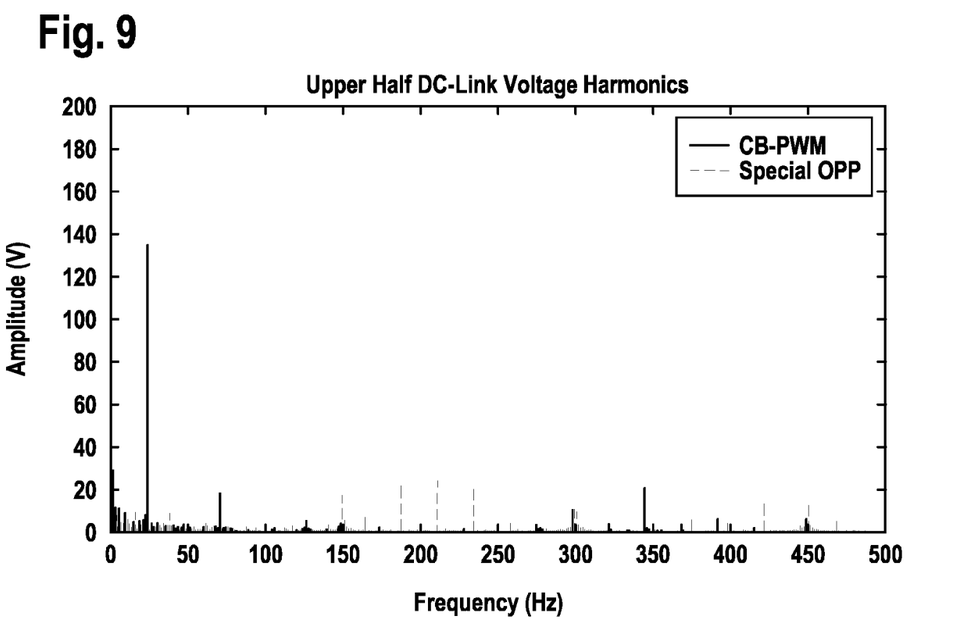
FIG. 9 schematically shows a comparison of amplitudes of an upper half DC-link voltage after a fast Fourier transformation resulting from a carrier-based pulse width modulation and resulting from optimized pulse patterns in accordance with one embodiment of the present disclosure.

Characteristic simulation results from a Simulink model with a dll generated from a software running in the controller 30 are shown in FIGS. 8 and 9.

FIG. 8 schematically shows a comparison of waveforms of an upper half DC-link voltage resulting from a carrier-based pulse width modulation (CB-PWM) and resulting from optimized pulse patterns in accordance with one embodiment of the present disclosure. Although a special CB-PWM that minimizes the NP ripple has been employed for this comparison, the peak voltage reaches close to the maximum allowed value of 2750 V. This means that only a marginal further increase of the power is possible.

FIG. 9 shows a comparison of amplitudes of an upper half DC-link voltage after a fast Fourier transformation resulting from a carrier-based pulse width modulation and resulting from optimized pulse patterns in accordance with one embodiment of the present disclosure. As can be seen in FIG. 9 the main ripple component appears at a frequency of 3 times the rotating electrical machine fundamental frequency. This is a typical NP ripple harmonic that appears for CB-PWM at high modulation indices. This strong harmonic causes significant voltage and current interharmonics at the transformer primary, which for some operating points exceed the limits set by the relevant standards.

When a special OPP is employed for the machine-side modulation, the peak value of the half DC-link voltage reduces significantly. Furthermore, there is no harmonic components that exceed 25 V, which means that no significant interharmonics will appear at the transformer primary on the grid side.

Figure 10:
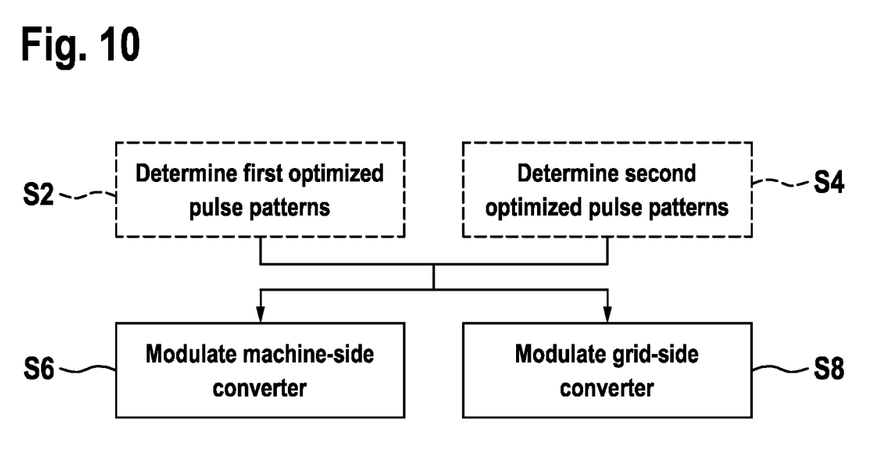
FIG. 10 schematically shows a flow diagram of an embodiment of a method for controlling an energy conversion system in accordance with the present disclosure.

FIG. 10 schematically shows a flow diagram of an embodiment of a method for controlling an energy conversion system in accordance with the present disclosure.

In step S2 first optimized pulse patterns may be determined. The first optimized pulse patterns may be determined in advance and/or offline. The first optimized pulse patterns are configured for modulating the machine-side converter, e.g., the machine-side converter 24, 44. The first optimized pulse patterns may be stored in a memory unit of the energy conversion system 20, e.g., a memory of the controller 30. The first optimized pulse patterns may be stored in form of a look-up table and/or associated to corresponding characteristics of the AC voltage.

The first optimized pulse patterns may have been optimized such that a DC-link ripple peak value of the first DC-link voltage $V_{Idc}$ or a DC-link voltage component of the DC-link voltage $V_{Idc}$ is constrained to a predetermined value, e.g., a minimal value. For example, the first optimized pulse patterns may be optimized such that the peak value of the DC-link voltage or of a DC-link voltage component of the DC-link voltage are constrained to a predetermined value. The first optimized pulse patterns may be optimized such that, in addition to the peak value of the DC-link voltage or the DC-link voltage component of the DC-link voltage a peak of a neutral point potential, a harmonic of the neutral point potential or of the total DC-link voltage, a total harmonic distortion of a converter current and/or an amplitude of one or more harmonics of an output voltage of the first machine-side converter 24 are constrained to a corresponding predetermined value. The first optimized pulse patterns may be determined such that an optimal trade-off between the harmonics of the neutral point ripple and the total DC-link voltage or the DC-link voltage component is achieved.

In step S4 second optimized pulse patterns may be determined. The second optimized pulse patterns may be determined in advance and/or offline and/or simultaneously as the first optimized pulse patterns. The second optimized pulse patterns are configured for modulating the grid-side converter 28, 48. The second optimized pulse patterns may be stored in a memory of the energy conversion system 20, e.g., a memory of the controller 30. The second optimized pulse patterns may be stored in form of a look-up table and/or associated to corresponding generator voltage frequencies.

In step S6 the machine-side converter 22, 44, e.g., the active rectifier, is modulated with the first optimized pulse patterns.

In step S8 the grid-side converter 28, 48, e.g., the inverter, is modulated. The grid-side converter may be modulated with CB-PWM. If the second optimized pulse patterns are determined in step S4, the grid-side converter may be modulated with the second optimized pulse patterns. Steps S6 and S8 may be carried out simultaneously or one after the other, wherein step S8 may be carried out before step S6 or vice versa.

While the disclosure has been illustrated and described in detail in the drawings and foregoing description, such illustration and description are to be considered illustrative or exemplary and not restrictive. The disclosure is not limited to the disclosed embodiments.

Other variations to the disclosed embodiments can be understood and effected by those skilled in the art and practicing the claimed disclosure, from a study of the drawings, the disclosure, and the appended claims. For example, the energy conversion system 20 of FIG. 1 may include the blades 50 coupled to the rotating electrical machine 22. Further, the energy conversion system 20 of FIG. 2 may not include any blades 50. Further, for example, the transformer 40 shown in FIG. 1 may be configured in accordance with the transformer 40 shown in FIG. 2. Further, for example, the rotating electrical machine 22 may output only two currents for one converter and, in case of two converters, two for the first converter and two for the second converter, wherein every converter may include a machine-side converter and a grid-side converter. Furthermore, instead of the generator the motor can be supplied by the machine-side converter. In this case the machine-side converters 24 and 44 operate as inverters whereas the grid-side converters 28 and 48 operate as rectifiers, which can be active or just diode rectifiers.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling an energy conversion system, the system comprising a rotating electrical machine, a machine-side converter, a DC-link and a grid-side converter, the method comprising:
   modulating the machine-side converter to convert an AC voltage of the rotating electrical machine into a DC voltage supplied to the DC-link; and
   modulating the grid-side converter to convert a DC-link voltage at the DC-link into an AC output voltage to be supplied to an electrical grid;
   wherein the machine-side converter is modulated with first optimized pulse patterns, which have been optimized such that a peak value of the DC-link voltage or of a DC-link voltage component of the DC-link voltage is constrained to a predetermined value.

2. A method in accordance with claim 1,
   wherein the DC-link voltage component is one of two halves of the DC-link voltage, a sum of the two halves of the DC-link voltage, or both halves of the DC-link voltage.

3. A method in accordance with claim 1,
wherein the grid-side converter is modulated with second optimized pulse patterns.

4. A method in accordance with claim 3,
wherein the first and/or the second optimized pulse patterns have been optimized, such that additionally to the peak value of the DC-link voltage or the DC-link voltage component of the DC-link voltage a peak of a neutral point potential, a harmonic of the neutral point potential or of a total DC-link voltage, a total harmonic distortion of a converter current and/or an amplitude of one or more harmonics of an output voltage of the machine-side converter are constrained to a corresponding predetermined value.

5. A method in accordance with claim 3,
wherein the first and/or the second optimized pulse patterns are determined such that an optimal trade-off between harmonics of a neutral point potential, and the peak value of the DC-link voltage or of the DC-link voltage component is achieved.

6. A method in accordance with claim 1,
wherein at least one of the predetermined values is a minimal value.

7. A method in accordance with claim 1,
wherein the optimized pulse patterns have a quarter wave symmetry, a half wave symmetry, or a generic full wave symmetry.

8. A method in accordance with claim 1,
wherein the optimized pulse patterns comprise at least one negative pulse in a positive half period and a positive pulse in a negative half period of a signal.

9. A method in accordance with claim 1,
wherein the optimized pulse patterns have been optimized such that a modulation index is within an interval from 0 to 1.27.

10. A method in accordance with claim 1,
wherein the optimized pulse patterns comprise switching angles defining phase angles at which an output level of the machine-side converter is switched.

11. A method in accordance with claim 1,
wherein the optimized pulse patterns are computed for a phase displacement angle of a fundamental current component.

12. A method in accordance with claim 1,
wherein the optimized pulse patterns are computed offline in advance, stored in a look-up table in a memory unit of the energy conversion system, and determined depending on characteristics of the AC voltage of the rotating electrical machine.

13. An energy conversion system, comprising:
a rotating electrical machine;
at least one machine-side converter coupled to the rotating electrical machine;
at least one DC-link coupled to the at least one machine-side converter;
at least one grid-side converter, which couples the DC-link to a grid; and
a controller being configured to control the energy conversion system according to the method in accordance with claim 1.

14. A controller for an energy conversion system adapted/configured to perform the method of claim 1.

15. A computer program for driving an energy conversion system, which, when executed by a processor, is adapted to perform the method of claim 1.

16. A computer-readable medium in which the computer program according to claim 15 is stored.

17. A method in accordance with claim 1, wherein the optimized pulse patterns have been optimized such that a modulation index is within an interval from 0.9 to 1.15.

* * * * *